United States Patent [19]

Selway et al.

[11] Patent Number: 5,812,822
[45] Date of Patent: Sep. 22, 1998

[54] APPARATUS FOR COORDINATING CLOCK OSCILLATORS IN A FULLY REDUNDANT COMPUTER SYSTEM

[76] Inventors: David W. Selway, 6542 N. 17th Ave., #15, Phoenix, Ariz. 85015; David A. Bowman, 5437 W. Tierra Buena La., Glendale, Ariz. 85306; Donald R. Kesner, 3819 E. Sequoia Trail, Phoeniz, Ariz. 85044; James H. Phillips, 410 E. Braeburn Dr., Phoenix, Ariz. 85022

[21] Appl. No.: 574,821

[22] Filed: Dec. 19, 1995

[51] Int. Cl.⁶ .................................................. G06F 1/10
[52] U.S. Cl. ........................ 395/500; 395/181; 395/556
[58] Field of Search .................... 395/500, 180, 395/181, 182.01, 182.08, 183.1, 185.08, 555, 556

[56] References Cited

U.S. PATENT DOCUMENTS

| | | | |
|---|---|---|---|
| 4,644,498 | 2/1987 | Bedard et al. | 395/182.01 |
| 4,920,540 | 4/1990 | Baty | 395/185.08 |
| 5,146,589 | 9/1992 | Peet, Jr. et al. | 395/182.01 |
| 5,426,778 | 6/1995 | Uchihori | 395/182.08 |
| 5,594,896 | 1/1997 | Carlson | 395/556 |
| 5,623,643 | 4/1997 | Janssen et al. | 395/500 |

*Primary Examiner*—Vincent N. Trans
*Attorney, Agent, or Firm*—J. S. Solakian; J. H. Phillips

[57] ABSTRACT

A redundant computer system including two systems capable of independent operation. The two systems correspondingly employ two independent clock generation and distribution (CGD) units which each issue clock and clock definer signals. When the two systems are split, each system is controlled by the oscillator signal generated by its own CGD unit. When the two systems are merged, one oscillator is designated as master, and its output is employed to derive the clock and definer signals on both sides of the redundant system. Special logic included in each CGD unit ensures that the change from master to slave (or slave to master) operation is performed without error. This special logic includes circuitry which places a temporary hold at a predetermined logic level on the local oscillator signal, which is in use when the switch is made, when the local clock and definer signals are both at the predetermined logic level. The hold continues until the oscillator which is to "take over" is also at the predetermined logic level.

9 Claims, 8 Drawing Sheets

FIG. 3A OSCA
FIG. 3B OSCR
FIG. 3C SP
FIG. 3D PHP1
FIG. 3E PHP2

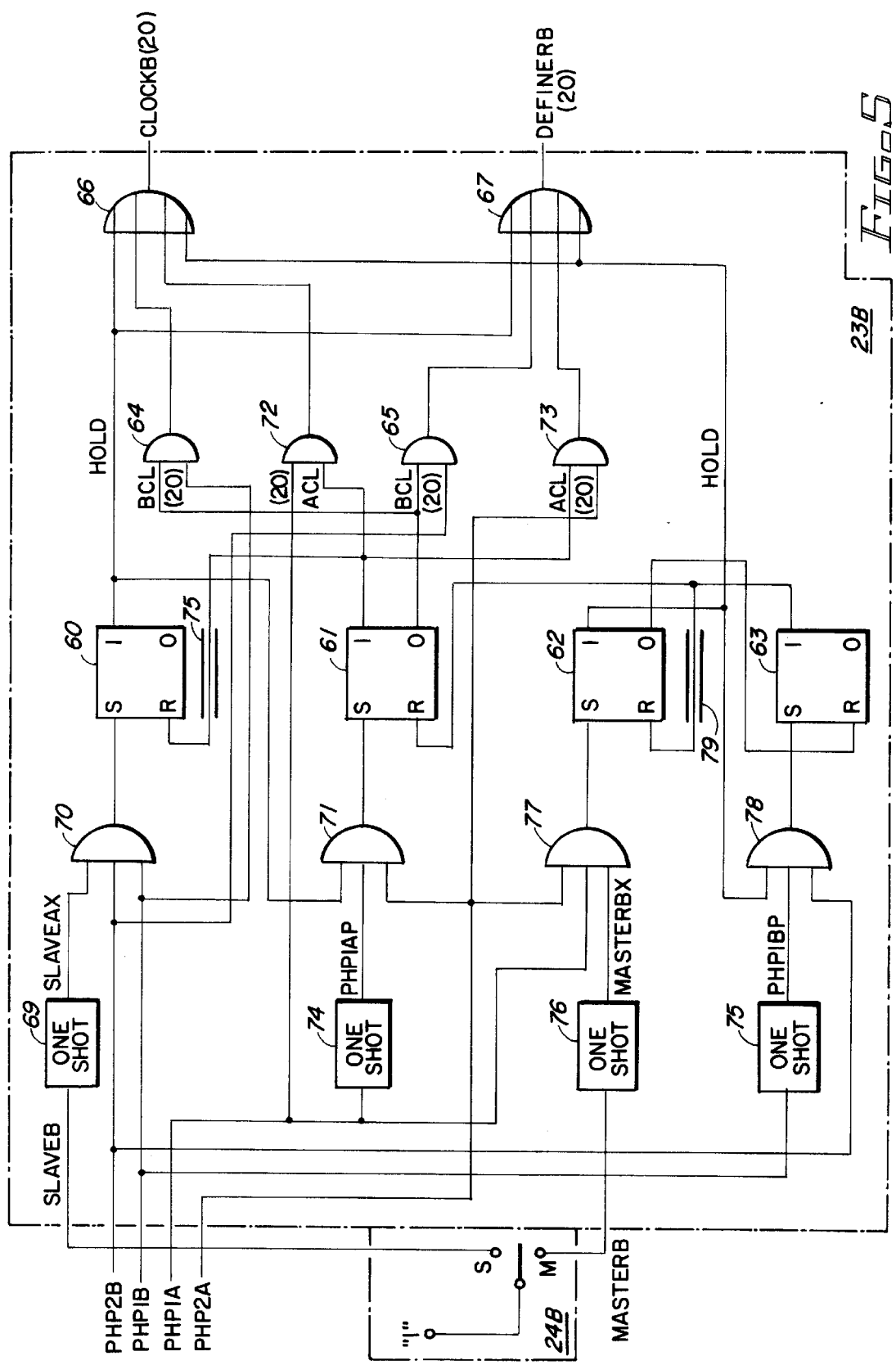

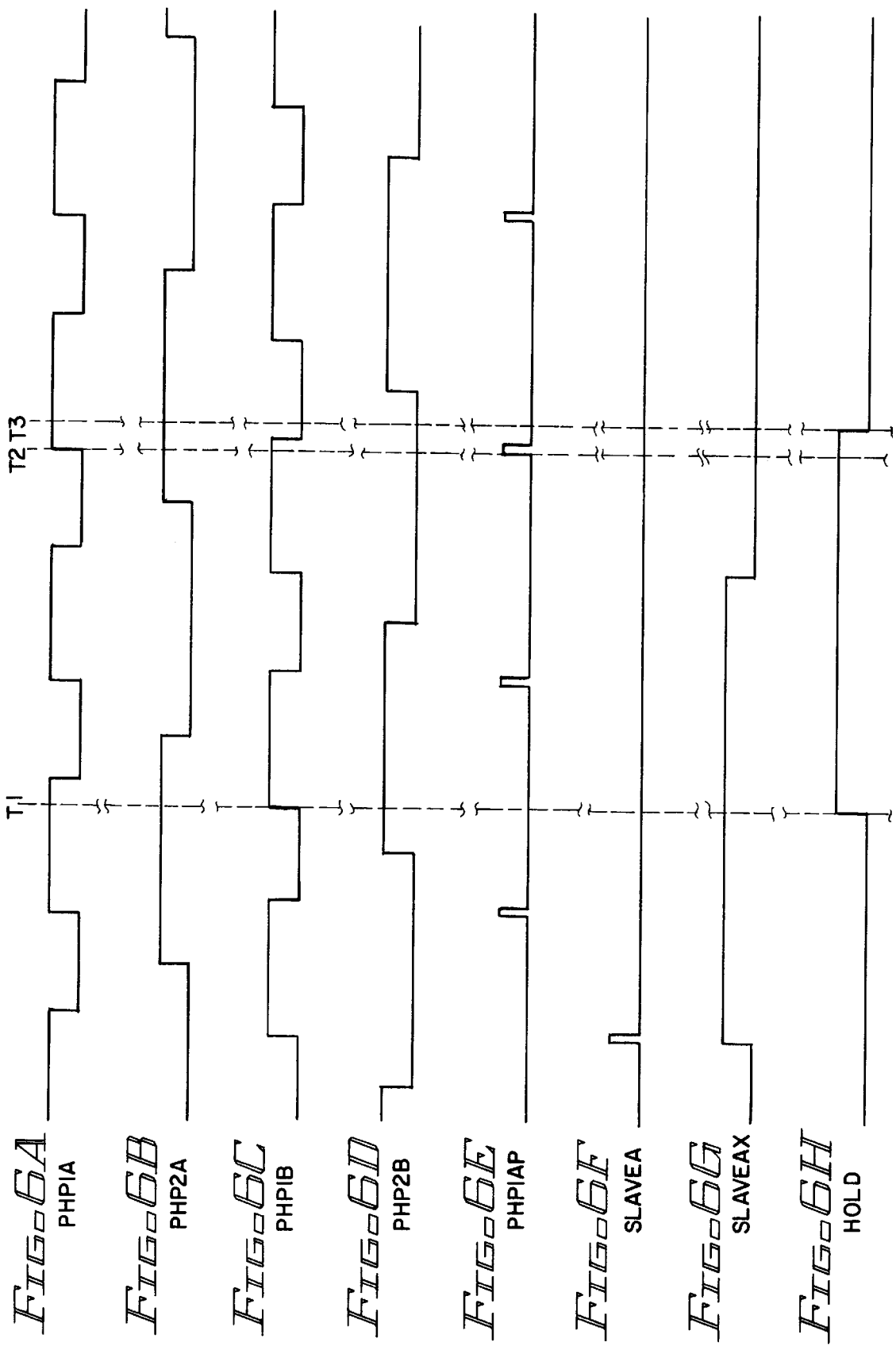

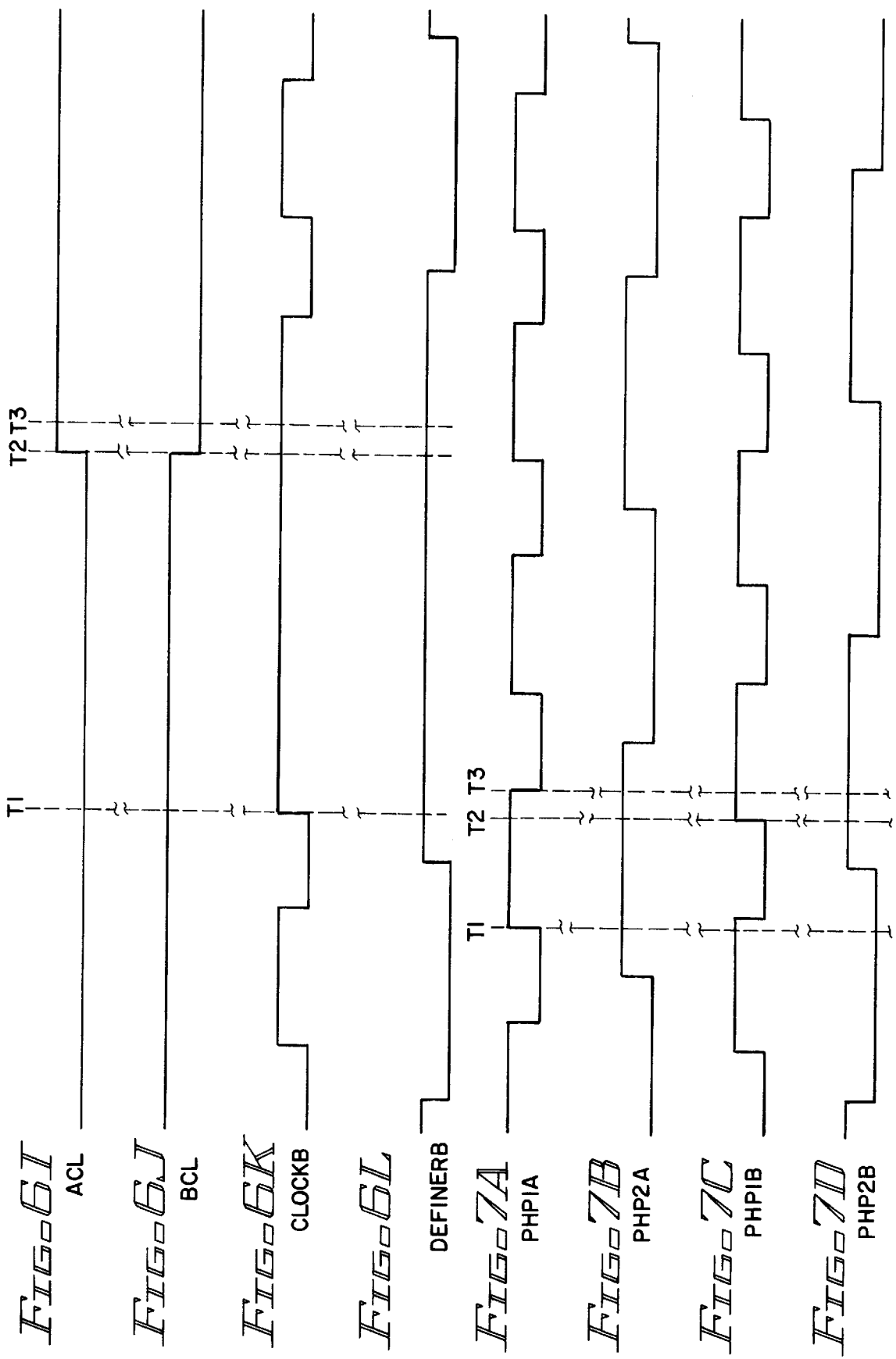

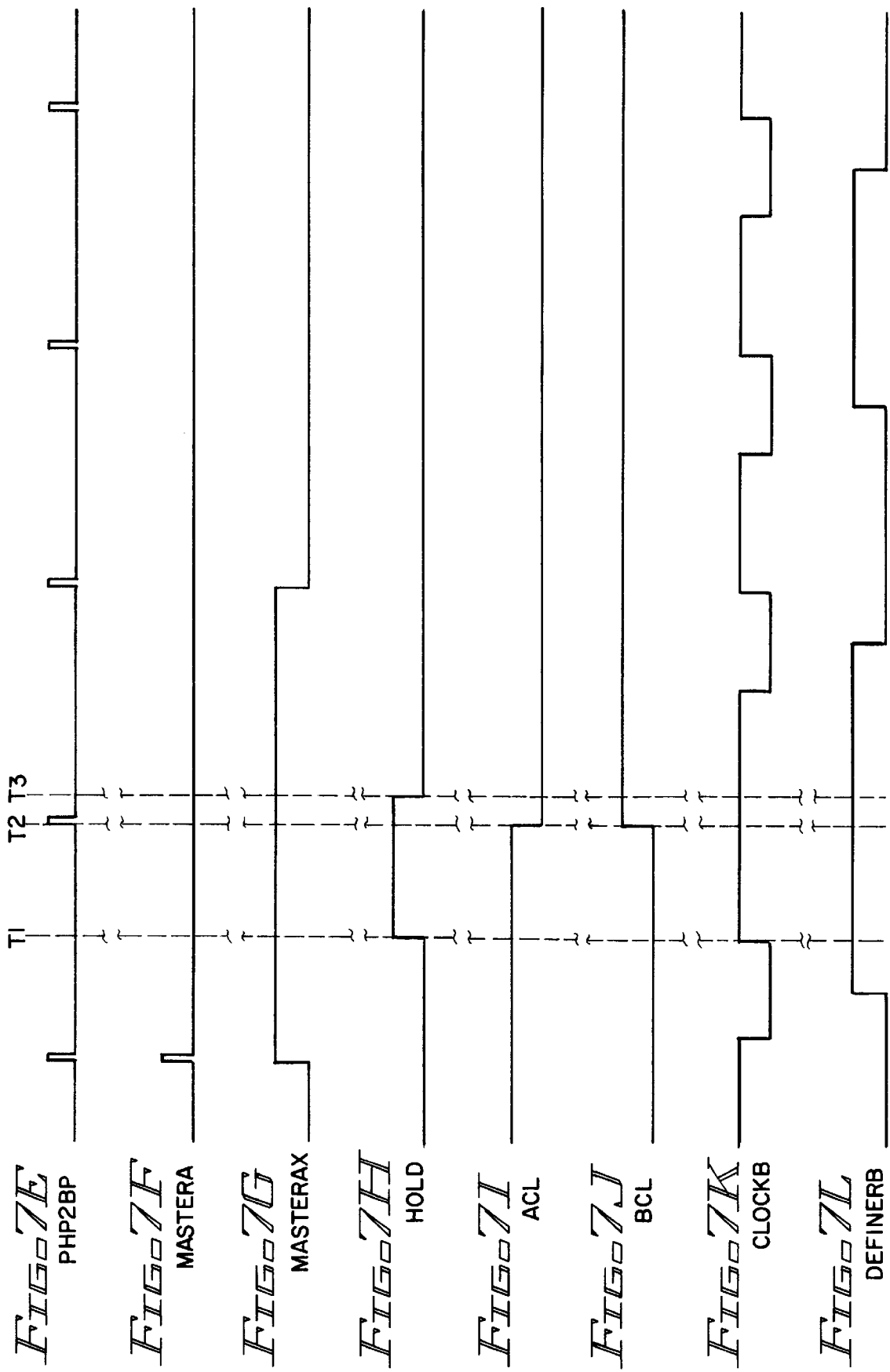

APPARATUS FOR COORDINATING CLOCK OSCILLATORS IN A FULLY REDUNDANT COMPUTER SYSTEM

FIELD OF THE INVENTION

This invention relates to the art of computer hardware and, more particularly, to insuring compatibility between two clock generating and distribution components during a merge of redundant computer systems.

BACKGROUND OF THE INVENTION

Some computer applications call for a high degree of system integrity, and various approaches have been taken to ensure that a system can continue to perform even in the event of failure of a key component. One such approach is to provide a fully redundant system in which each system component is duplicated, thus effecting two systems, each capable of operating independently, comprising the redundant system. There are distinct advantages to this approach including the fact that, in effect, the power of a tandem system is available for use during normal, failure-free operation. Further, if a component failure should take place, it may be, and usually is, possible to continue operation with a tolerable decrease in performance. The degree of adverse effect on overall system performance from such a failure depends, of course, on which component fails in a given case.

One source of problems which arises in implementing a fully redundant system is found in the necessity to integrate redundant clock generation and distribution (CGD) units into the redundant system. During normal operation, the redundant system operates under a rationalized clock basis. For example, one of the CGD units may operate in a "master" mode and source the clocks for both systems. If a component in one of the systems fails, the redundant system may be split such that the other system can continue operation under control of its own CGD unit while repairs are made to the failed system.

Once repairs have been made to the failed system, it may be tested operating under control of its own CGD unit. However, after its integrity has been confirmed, the two systems must be capable of being remerged on-the-fly. A similar condition exists on routine startup of the redundant system. Both of these related tasks may be complicated by such factors as instantaneous phase differences between the two clock sets, slight frequency differences between the two governing oscillators, slight differences in delays inherent in the physical and electrical displacements between the two CGD units, etc. It is to the solution of all these and other related problems that the present invention is directed.

OBJECTS OF THE INVENTION

It is therefore a broad object of this invention to provide improved clock generation and distribution units in a fully redundant computer system.

It is a more specific object of this invention to provide such improved clock generation and distribution units in which the difficulty of rationalizing differences between the outputs of the two clock generating and distribution units, during a merge of the two systems after a repair to one or during system startup or under other conditions in which the systems have been operating independently and must be merged, is overcome.

SUMMARY OF THE INVENTION

Briefly, these and other objects of the invention are achieved, in a redundant computer system made up of two computer systems each capable of independent operation, by employing two independent clock generation and distribution (CGD) units which each issue clock and clock definer signals. When the two systems are split, each system is controlled by the oscillator in its own CGD unit. When the two systems are merged, one oscillator is designated as master, and its output is employed to derive the clock and definer signals on both sides of the redundant system. Special logic included in each CGD unit ensures that the change from master to slave (or slave to master) operation is performed without error. This special logic includes circuitry which places a temporary hold or freeze, at a predetermined logic level, on the local clock and definer signals which are in use when the switch is made when the local clock and definer signals are both at the predetermined logic level. The hold continues until the clock and definer signals from the system supplying the oscillator which is to "take over" are also at the predetermined logic level.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 5 is a detailed block diagram of a selector circuit incorporated into each clock and generation and distribution unit;

FIGS. 6A–6L are timing diagrams illustrating the relationships among various signals during the transition from master to slave operation; and FIGS. 7A–7L are timing diagrams illustrating the corresponding relationships among the various signals during the transition from slave to master operation.

DESCRIPTION OF THE PREFERRED EMBODIMENT(S)

Figure 1:
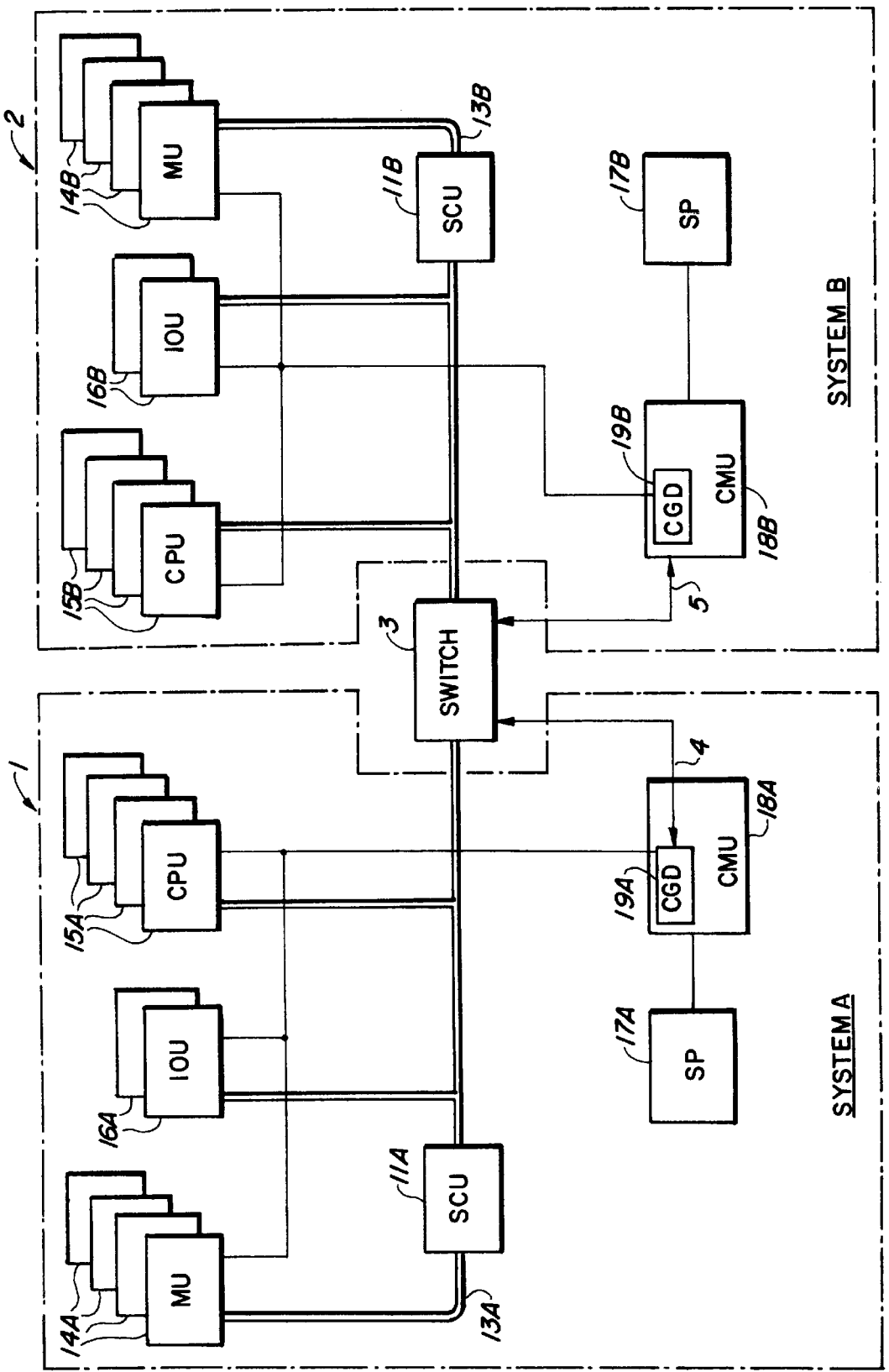
FIG. 1 is a high level block diagram of an exemplary fully redundant computer system effecting an environment in which the present application finds use.

Attention is first directed to FIG. 1 which illustrates an exemplary redundant computer system within which the subject invention may be incorporated and practiced. The redundant computer system may conveniently be separated into system A 1 and system B 2 with the addition of switch 3.

Referring specifically to system A 1, a System Control Unit (SCU) 11A centralizes and controls the scheduling of a system bus 12A and a memory bus 13A. More particularly, the SCU 11A: a) performs memory control including single bit error correction and double bit error detection; b) controls the memory configuration of which there are one per Memory Unit (MU) 14A; c) manages 64-byte block transfers between Central Processing Units (CPUs) 15A and the MUs in conjunction with a store-into-cache feature of the CPUs; d) corrects single bit errors found in modified blocks of a CPU's cache or on a data transfer from a CPU, MU or an input/output Unit (IOU) 16A; and e) contains the system calendar clock.

The system bus 12A interconnects one or more CPUs 15A and one or more IOUs 16A with each other and with the SCU 11A. In the exemplary environment, the system bus includes a 16-byte bi-directional data interface, a bi-directional address and command interface, an SCU status interface monitored by all CPUs and IOUs, and a small number of control lines between the SCU and each individual CPU and IOU. Data is exchanged on the system bus in 16, 32 or 64-byte groups, and data exchanges can be between a CPU and an MU, an IOU and an MU, first and second CPUs and a CPU and an IOU. The operations through the system bus 2A are: a) read: 16, 32 or 64 bytes; c) read with exclusivity: 64 bytes; d) write from IOU: 16, 32 or 64 bytes; e) write from CPU (swapping): 64 bytes; and f) interrupts and connects; -read/write registers.

Every system bus operation consists of an address phase and a data phase, and an address phase can start every two machine cycles. Consecutive 16-byte data transfers within a group can occur on consecutive machine cycles. An IOU 16A or a CPU 15B can wait for the data phase of up to two requests at the same time. The data blocks are transferred in the same order as the requests are received.

The memory bus 13A interconnects one or more MUs 14A with the SCU 11A. In the example, the memory bus includes a 16-byte bi-directional data interface, an address and command interface from the SCU to all MUs and a small number of control lines between the SCU and each individual MU. Data is exchanged on the memory bus in 16, 32 or 64-byte groups. The operations through the memory bus 3 are: a) read: 16, 32 or 64 bytes; and b) write: 16, 32 or 64 bytes.

The main memory of system A 1 is composed of one or more MUs 14. A single bit correction, double bit detection code is stored with every double word; i.e., eight code bits for every 72 data bits. The code is arranged so that a four-bit error within a single chip is corrected as four single bit errors in four different words. Data in an MU 14A is addressed from the SCU 11A in 16 byte (four word) increments. All bytes within any one MU are consecutively addressed; i.e., there is no interlace between MUs which operate in parallel. A memory cycle may start every machine cycle, and a memory cycle, as seen from a CPU 15A, is ten machine cycles, assuming no conflicts with other units. An exemplary MU 14A contains 160 Dynamic Random Access Memory (DRAM) circuits (not shown), each of which has n by four bit storage elements where n=256, 1024 or 4096.

The IOUs 16A each provide a connection between the system bus 2A and one or more I/O subsystems, not shown in FIG. 1.

A Clock and Maintenance Unit (CMU) 18A generates, distributes and tunes the clock signals for all the units in system A 1, provides the interface between a service processor (SP) 17A and the central processing, input/output and power subsystems, initializes the units of system A and processes errors detected within the various units in system A. Included within the CMU 18A is a clock generating and distribution (CGD) unit 19A which is a key element in the present invention and will be discussed in more detail below. Clock information is distributed from the CGD unit to the other units so system A 1 via clock bus 20A.

SP 17A may be a commodity personal computer with an integrated modem for facilitating remote maintenance and operations. (Large systems may include two SPs through which the system can be dynamically reconfigured for high availability.) The SP performs four major functions: a) monitors and controls system A 1 during initialization, error logging and diagnostic operations; b) serves as the primary operating system console during system A boot or on operator command; c) serves as console and data server for the input/output subsystems Maintenance Channel Adapter (not shown in FIG. 1); and d) provides a remote maintenance interface.

With respect to system B 2, units corresponding to those in system A 1 are denoted with a "B" suffix; i.e.: SCU 11B, system bus 12B, memory bus 13B, MUs 14B, CPUs 15B, IOUs 16B, SP 17B, CMU 18B and CGD 19B. Thus, it will be understood that systems A 1 and B 2 effect a redundant computer system when integrated by certain coupling structure represented by switch 3 which couples the system busses 12A and 12B. In addition, CGD unit 19A and CGD unit 19B are coupled to one another via line sets 4, 5 and the switch 3 as will be described more fully below.

Figure 2:
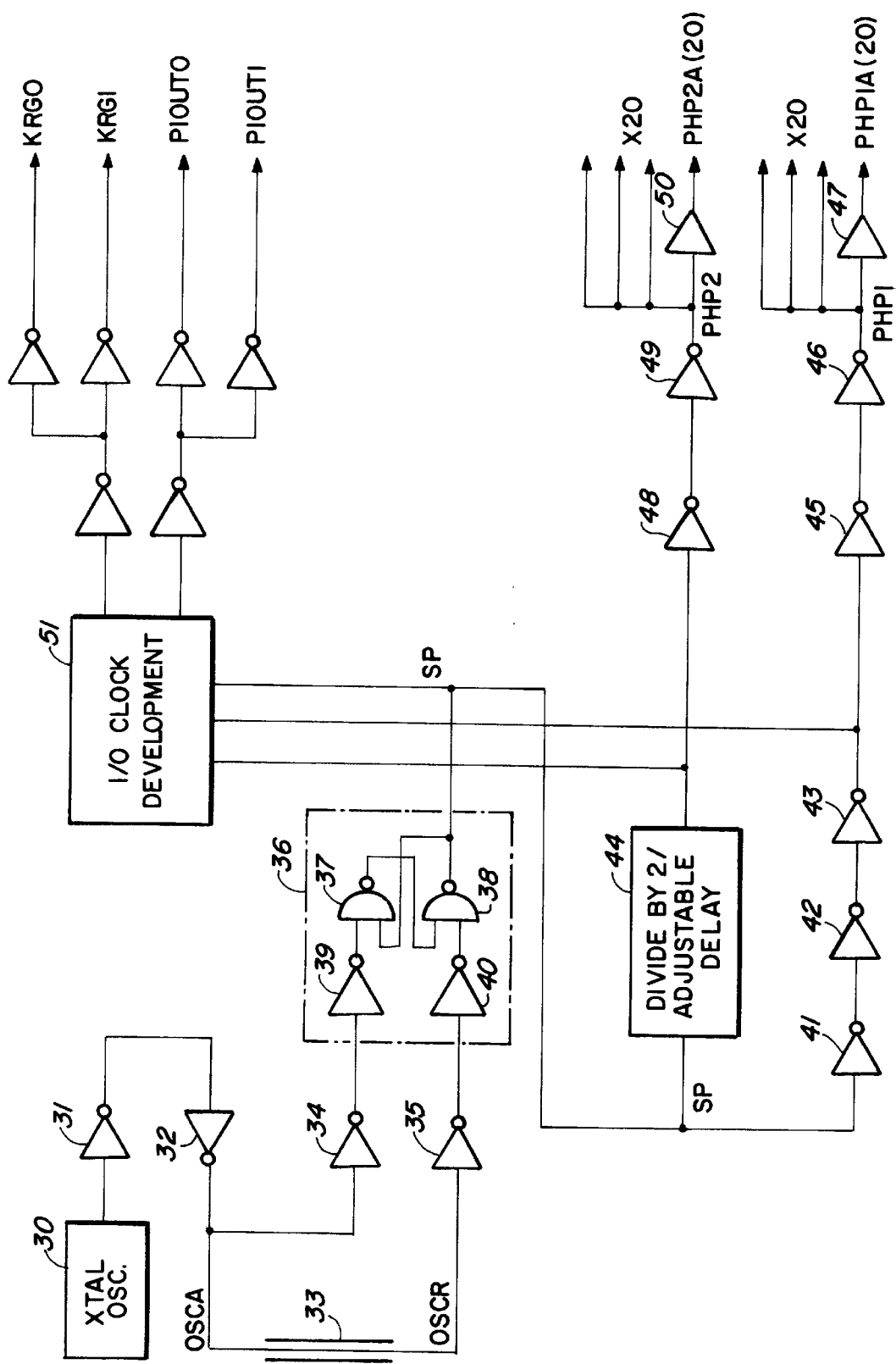
FIG. 2 is a simplified schematic diagram of a clock generation and distribution unit included in each system making up the redundant system.
Figure 3:
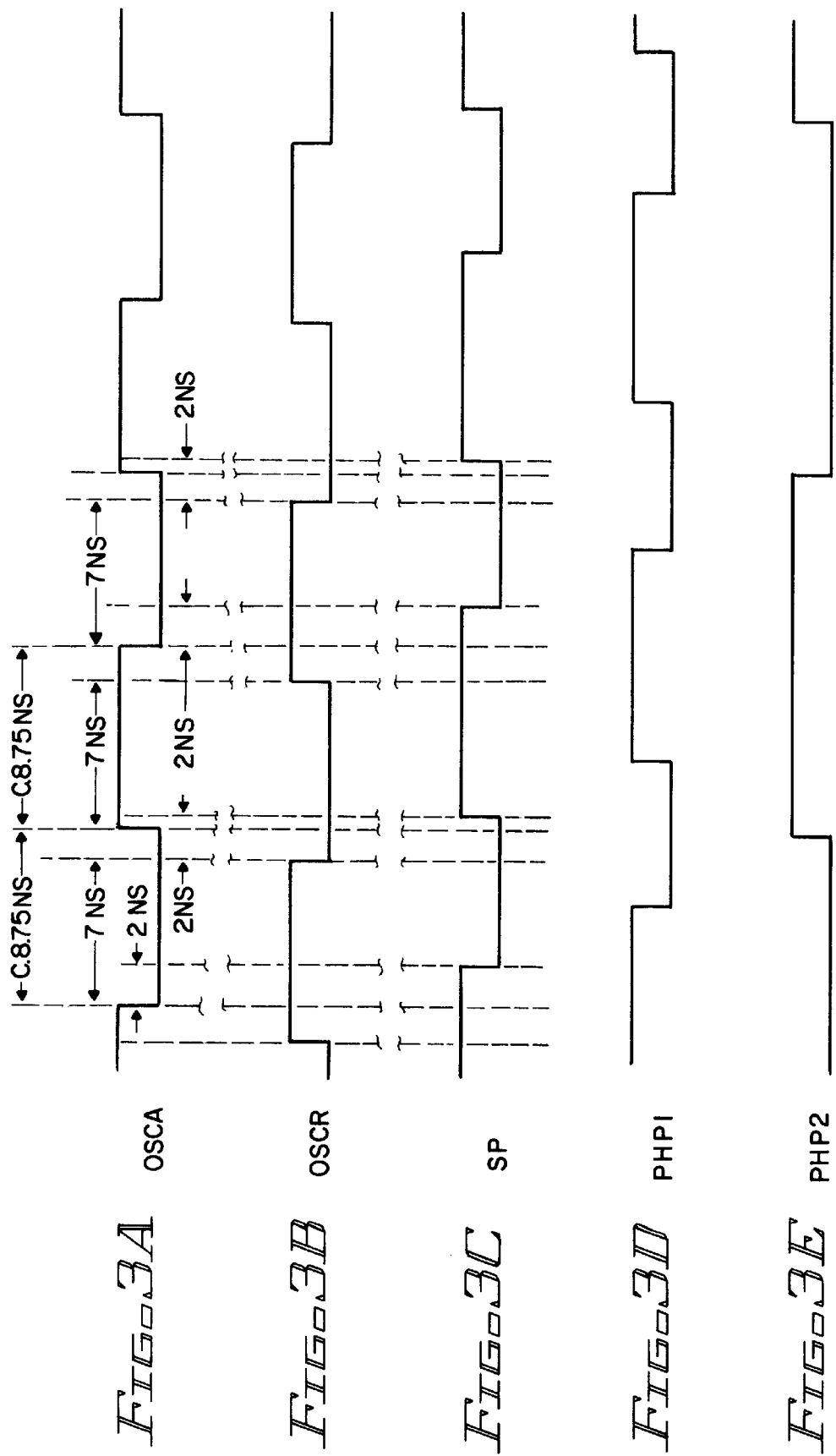
FIGS. 3A–3E are waveform diagrams illustrating the relationships among various signals of the logic circuitry illustrated in FIG. 2.

Attention is now directed to FIG. 2 which illustrates an exemplary CGD unit; e.g., CGD unit 19A. Reference may also be taken to FIG. 3 which shows waveforms of various signals in the CGD unit. The basic timing element in the CGD unit is a crystal oscillator 30 which drives a squaring-up circuit, typically a Schmitt trigger, 31 which issues a square wave at the oscillator frequency, 57.14 MHZ in the specific example. The output from squaring-up circuit 31 drives a constant impedance buffer 32, the output of which is designated OSCA, and the waveform of which is included in FIG. 3. OSCA is applied to the input of a delay line 33 which issues OSCR, a signal retarded from, but otherwise identical to, OSCA by seven nanoseconds in the example.

The signal OSCA is also applied to the input of an inverter 34, and the signal OSCR is also applied to the input of another inverter 35. The inverters 34, 35 drive a waveshaper circuit 36 which includes a pair of cross-coupled NAND-gates 37, 38. Inverter 34 drives inverter 39 which, in turn, drives the second input to NAND-gate 37. Similarly, inverter 35 drives inverter 40 which, in turn, drives the second input to NAND-gate 38. The output signal SPA from the waveshaper circuit 36 is taken from the output of NAND-gate 38, and SPA is also shown in FIG. 3. There is an inherent delay of about two nanoseconds from the inputs to the inverters 34, 36 and the outputs of the NAND-gates 37, 38.

The temporal relationships among the signals OSCA, OSCR and SPA may best be understood from FIG. 3. At the exemplary oscillator frequency of 57.14 MHZ, each cycle of OSCA is about 17.5 nanoseconds, and the full cycle period of OSCR is the same, but retarded by seven nanoseconds. Both OSCA and OSCR are nominally symmetrical; i.e., their "up" and "down" logic level periods are about equal, c.8.75 nanoseconds in the example. However, it will be observed that SPA is not symmetrical, and this is a result of the development in the waveform shaper 36 by which the trailing edge of SPA follows by about two nanoseconds (the nominal delay through the waveshaper 36 and the inverters 34, 35) the trailing edge of OSCA while the leading edge of SPA trails by about two nanoseconds the trailing edge of OSCR which, itself, trails the trailing edge of OSCA by the seven nanoseconds delay through delay line 33. Thus, the "down" time of SPA is about seven nanoseconds, and the "up" time of SPA is the remaining time in a basic clock cycle as established by the oscillator 30; i.e., about 10.5 nanoseconds in the example.

The signal SPLA (SPA or SPB as selected by selector block 23A as will be explained below) is applied to the input of three serially-connected inverters 41, 42, 43 through which a certain amount of delay is obtained The output from inverter 43 is designated PHP1A. The signal SPLA is also applied to logic block 44 in which it is frequency divided by two to obtain signal PHP2A. In addition, the frequency division process renders PHP2A symmetrical, which characteristic is used to advantage as will be discussed more fully below. Logic block 44 also includes an adjustable delay by which the signal PHP2A may be precisely adjusted with respect to PHP1A during system setup in the manner well known in the art.

PHP1A is applied to the input of an inverter 45 which drives amplifier 46. Amplifier 46 thus issues PHP1A to several boards in system A (which carry the CPUs, SCU, IOUs, MUs) on the clock bus 20A as shown in FIG. 1 In the example, twenty copies of PHP1A are sent to other system components in system A 1. Similarly, PHP2A, a symmetrical, half-frequency, time-displaced evolution of PHP1A, is applied to the input of an inverter 48 which drives amplifier 49. Amplifier 49 thus issues PHP2A to several boards in system A. In addition, PHP2A is sent to CGD unit 19B of system B 2 via switch logic block 3 as shown in FIG. 1.

Referring again also to FIG. 3, the relationship of PHP1A and PHP2A (as adjusted during system calibration) will be readily understood. PHP1A, as previously noted, is asymmetrical (being a delayed replica of SPLA), and it is the main system "clock". However, various events take place in the system on the leading or trailing edge of the logic "1" state of PHP1A and, in many instances, it is necessary to know which of two succeeding logic "1" PHP1A clock states should cause an event to occur; i.e., it is necessary to have available the equivalent of a two-phase clock. This is achieved by defining alternate logic "1" "phases" of PHP1A by the state of PHP2A. Thus, PHP2A is aligned to temporally "bracket" the PHP1A pulses such that a given PHP1A logic "1" pulse is defined as "phase 1" by a logic "1" PHP2A half cycle, and the next succeeding PHP1A logic "1" pulse is defined as "phase 2" by a logic "0" PHP2A half cycle. For this reason, PHP2A is referred to as a "definer".

Figure 4:
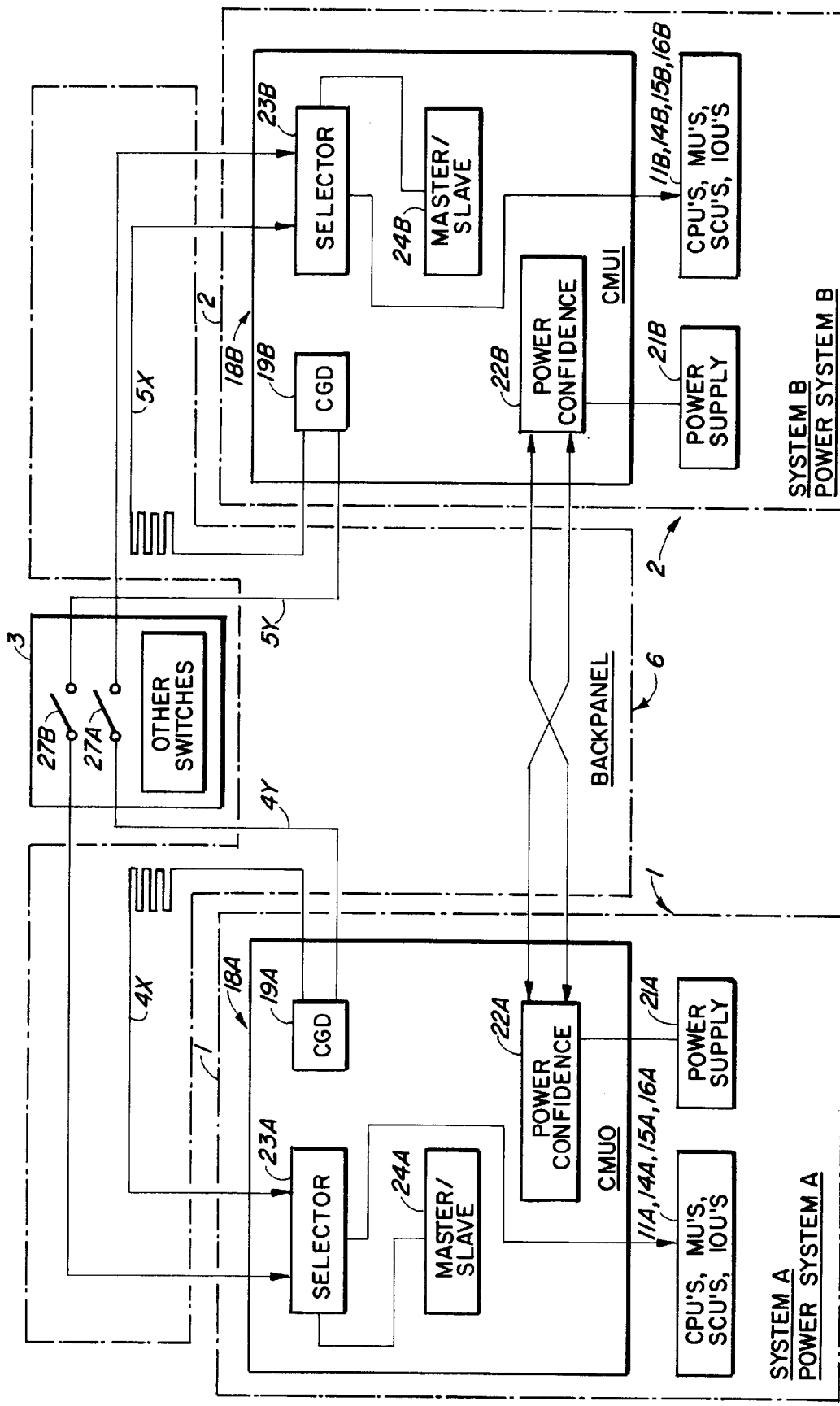
FIG. 4 is a high level block diagram illustrating the inter-relationship between the respective clock generation and distribution units in the two systems making up the redundant system.

Referring to FIG. 4, the relationship between the CMU0 18A of System A 1 and the corresponding CMU1 18B of system B 2 may be understood. For purposes of explanation, these two CMU units are considered to be substantially identical such that their descriptions may be partially combined.

Thus, CMU0 18A and CMU1 18A, 18B each include a CGD unit 19A, 19B which has been previously described in conjunction with FIG. 3. Each CGD unit 19A, 19B uses one of two selectable oscillator signals (SPA, SPB) for developing clock and definer signals for use in its own system components. More particularly, for example, the CGD unit 19A of system A sends SPA to the selector circuit 23A through a delay line 25A. In addition, the CGD unit 19A also sends SPA and PHP1A to the selector logic 23B of CMU1 18B via switches 27A, 28A in the switch logic 3.

Similarly, the oscillator signal SPB generated in CGD unit 19B is coupled, via delay line 25B, to its local selector logic 23B and also, via switch 27B, to the selector logic 23A of CMU0 18A. PHP2B, also generated in CGD unit 19B, is sent to selector logic 23A of CMU0 18A through switch 28B. Master/slave select circuit blocks 24A, 24B connected, respectively, to selector logic blocks 23A, 23B are employed to determine, manually or automatically, which oscillator signal, SPA or SPB, is to be employed to develop clock and defmer signals for distribution to the CPUs 11A, 11B; MUs 14A, 14B; SCUs 15A, 15B and IOUs 16A 16B.

Assume, merely for purposes of illustration, that the redundant system is operating such that each of system A 1 and system B 2 is employing its own internal clock; i.e., switches 27A, 27B, 28A, 28B and the other switches in switch structure 3 are open. Under that condition, both systems in "master" mode, SPA is sent through the delay line 25A to the selector 23A and used to develop the clock and definer signals which control to the other system components in system A. Similarly, SPB is sent through delay line 25B to selector 23B and used to develop the clock and definer signals generated in CGD unit 19B which are distributed to the other components of system B. The delay lines 25A and 25B, which may merely be extended traces on the printed circuit (not shown) of a back panel 6, are employed to ensure that the instantaneous phases of SPA and SPB are the same in both systems; i.e., physical separation is directly compensated.

Power confidence circuits 22A, 22B, may be usefully employed to monitor each power supply 21A, 21B to establish automatic switchover to independent operation in case one or the other of the power supplies fails which is one of the most likely failures in the redundant system.

Attention is now directed to FIG. 5 which is a detailed logic diagram of the selector circuit 23B of CMU1 18B and also includes a simplified representation of master/slave mode select circuit 24B. Assume, as a convenient starting point, that the two systems making up the redundant system are operating, independently; i.e., each under control of its own, internally generated, clocks and definers. In this condition, the four rising leading edge triggered type flip-flops 60, 61, 62, 63, for reasons which will become more evident below, will all be reset such that their "1" outputs are all at the logic "0" level and their "0" outputs are therefore all at logic "1". It will be observed that the "0" output ACL from flip-flop 61 enables one input to AND-gate 73. The remaining input to AND-gate 73 is driven by the signal SPA; i.e., the locally generated oscillator signal. AND-gate 73 drives one input to OR-gate 67 which therefore issues SPA as SPAL, the oscillator signal currently in use in system A 1 to develop clock and definer signals PHP1A and PHP2A.

Consider now a condition under which it is desired to establish the fully redundant system and that it has been determined that CMU1 18B (FIG. 4) is to be the master oscillator source; i.e., oscillator signal SPB issued from CGD unit 19B is to be used to develop the clock and definer signals steered not only to the system components in system B 2, but also to the system components in system A 1. Since the CGD units 19A, 19B have been operating independently, it is necessary to rationalize the clock and definer signals generated by CGD unit 19A under conditions which will ensure a smooth transition from the use of SPA to the use of SPB. This involves certain transitional handling of the clock and definer and oscillator pulses from both systems A and B.

Under the exemplary conditions, it is desired to render system A to operate in the CMU0 18A slave mode. Referring also to the timing diagram of FIG. 6, switch 68 may therefore be momentarily actuated to the "S" position to place a logic "1" input signal on a one shot flip-flop 69. (It will be understood that the simplistic representation of the switch 68 is for purposes of illustration only, and the master/slave selection circuitry 24A may be as elaborate and automatic as is desired in a given redundant system.) One shot flip-flop 69 responds by issuing a logic "1" pulse SLAVEAX, having a predetermined period, which is employed as one input to an AND-gate 70. The predetermined time period of the pulse issued by the one shot flip-flop 69 should be about 1½ times the full cycle period of PBP2A, i.e., on the order of 25–30 nanoseconds in the example, in order to ensure safe operation of the succeeding step.

Second and third inputs to the AND-gate 70 are PBP1A and PHP2A. Thus, when (at T1) these two signals are both at logic "1" level and the logic "1" signal is present from the one shot flip-flop 69, AND-gate 70 will be fully enabled and issue a logic "1" pulse to set flip-flop 60. The "1" output from flip-flop 60 therefore switches to a logic "1" level ("hold") which is applied as another input to OR-gate 67. As a result, SPLA is temporarily held at a logic "1" level.

In addition, the "1" output signal from the flip-flop 60 is applied as one input to an AND-gate 71 which has, as its other input, SPBP which is a derivative of SPB. SPBP is a short pulse from the output of one shot 75 that is driven by SPB. One shot 75 is configured to switch briefly to logic "1" at each leading edge of SPB.

Thus, on the first occasion (T2) after SPLA has been placed into a hold condition during which SPB switches to the logic "1" level, AND-gate 71 becomes fully enabled and issues an output signal which sets flip-flop 61. As a result, the "0" output ACL from flip-flop 61 switches to logic "0" which serves to disable AND-gate 73 to thereby lock out SPA. At the same time, the "1" output BCL from flip-flop 61 switches to logic "1" to enable a first input to AND-gate 72. Consequently, SPB is coupled through AND-gate 72 to OR-gate 67.

The logic "1" level from the "1" output of flip-flop 61 is also applied to one input of AND-gate 74 which has PHP2B and SPBP as two additional inputs. A fourth input to AND-gate 74 is from the output of an inverter 64 which is driven by the SLAVEAX signal. Therefore, AND-gate 74 will be fully enabled the first occurrence after the one shot 69 has timed out that PHP2B and SPBP are both present. When AND-gate 74 is fully enabled at T3, flip-flop 60 is reset which removes the logic "1" hold from the OR-gate 67 leaving SPB as the governing oscillator SPAL which is now used to develop the clock and definer signals in system A and well as system B. It will therefore be understood that no disturbance was made to the logic circuitry throughout system B which are controlled by PHP1A and PHP2A other than a brief hold at a "safe" logic "1" level. Thereafter, system A 1, as well as system B 2, operates under control of the oscillator signal generated in system B.

After this operation has completed, it is safe, with respect to the redundant system clock and definer signals, to close the other switches represented by the logic block 3 (FIGS. 1 and 4) to couple the two system busses 12A, 12B together for information interchange between system A 1 and system B 2, thereby establishing the redundant system for normal operation. Those skilled in the art will understand that further steps, unrelated to rationalization of the clock and definer signals which is the subject matter of the present invention, may be necessary before the switches coupling the two system busses are closed.

Consider now a condition in which system A 1 has been operating in the slave mode as described above and there is now some reason, such as the occurrence of a fault or a total system reboot, which requires a change to independent operation. Referring also to the timing diagram of FIG. 7, actuation of the switch 68 to the "M" position triggers one shot flip-flop 76 which drives, for a predetermined period of on the order of 25–30 nanoseconds as before, one input to AND-gate 77. The other two inputs to AND-gate 77 are PHP1A and PHP2A. Thus, when PHP1A and PHP2A are both logic "1" (T1), AND-gate 77 becomes fully enabled and issues a logic "1" output to set flip-flop 62. The "1" output from flip-flop 62 switches to logic "1" which is connected as an input to OR-gate 67 and thereby temporarily places a logic "1" hold condition on SPLA. In addition, the "1" output from flip-flop 62 is connected to one input of another AND-gate 78 which has a derivative of SPA (SPAP) as its other input. SPAP is a short pulse generated on the leading edge of SPA by one shot 75. Therefore, when SPA switches to the logic "1" level next following the setting of flip-flop 62 (T2), AND-gate 78 becomes fully enabled to set flip-flop 63.

The "1" output from flip-flop 63 is connected directly to the reset input of flip-flop 61 which is thereby reset. Consequently, the "0" output ACL of flip-flop 61 switches to logic "1" to enable one input to AND-gate 73 such that SPA is coupled through AND-gate 73 and to the OR-gate 67.

The reset input of flip-flop 62 is driven by the output of an AND-gate 65 which has as its inputs the "1" output of flip-flop 63, SPAP and the output of an inverter 66 which has MASTERAX as its input. Therefore, AND-gate 65 is fully enabled at T3 which occurs on the next succeeding switch to logic "1" by SPA after one shot 76 has timed out. This condition resets flip-flop 62 to remove the "hold" condition from OR-gate 67, thus permitting SPA to take over as SPLA in system A. The "0" output from flip-flop 62, which switches to logic "1" at this time, serves to reset flip-flop 63 after a slight delay through delay line 67 to avoid a logic race.

It will therefore be appreciated that the logic circuit illustrated in FIG. 5, which, of course, is replicated in selector 23B and master select 24B, of system B 2, serves to permit a smooth switch to either slave or master operating conditions without disturbing the logic circuitry of the CPUs, MUs, SCUs, and IOUs of the individual systems making up the redundant system.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A redundant computer system comprising:
   A) first and second computer systems, each said first and second computer system including:
   1) at least one central processing unit;
   2) a clock unit including:
      a) a clock generating and distribution unit including oscillator means for generating an oscillator signal at a predetermined frequency;
      b) clock and definer signal generating means driven by a local oscillator signal selected from said oscillator signals generated in each of said clock generating and distribution units, said clock and definer signal generating means being adapted to generate a clock signal at said predetermined frequency of said local oscillator signal and a definer signal having a frequency which is half said predetermined frequency of said local oscillator signal, said clock generating and distribution unit further including time alignment means for delaying one of said clock and definer signals such that successive definer signal half cycles at logic "1" and logic "0" levels temporally bracket said clock signal full cycles at a first logic level, selected from logic "1" and logic "0" levels, to define successive clock pulses at said first logic level as first and second phases thereof;

c) selection circuit means for selecting said local oscillator signal from only one of said first system and said second system for development of said clock and definer signals as local clock and definer signals; and d) bus means for conveying said local clock and definer signals to said central processor unit to coordinate the data manipulation operations therein;

B) means coupling said oscillator signals generated in each of said first and second computer systems to said selection circuit means in each of said first and second computer systems; and C) said selection circuit means in each said clock unit further including:

1) clock mode selection means for selecting slave mode operation for the system in which said clock unit is resident;

2) first hold means responsive to the selection of said slave mode of operation for invoking a first hold condition on said local oscillator signal at a first logic level when said local clock and definer signals are both at said first logic level;

3) first sensing means for sensing when said definer signal in said system in which said clock unit is not resident is at said first logic level; and 4) first switchover means responsive to said first sensing means sensing that said definer signal in said system in which said clock unit is not resident is at said first logic level to:

i) release said hold invoked by said first hold means; and ii) issue said oscillator signal in said system in which said clock unit is not resident as said local oscillator signal.

2. The redundant computer system of claim 1 which further includes:

A) clock mode selection means for selecting master mode operation for the system in which said clock unit is resident;

B) second hold means responsive to the selection of said master mode of operation for invoking a second hold condition on said local oscillator signal at a first logic level when said local clock and definer signals are both at said first logic level;

C) second sensing means for sensing when, after said second hold condition has been invoked, said local clock and definer signals are both at said first logic level and said oscillator signal generated in the system in which said clock unit is resident switches to said first logic level; and D) second switchover means responsive to said second sensing means sensing that said local clock and definer signals and said oscillator signal generated in the system in which said clock unit is resident are all at said first logic level to:

1) release said second hold invoked by said second hold means; and 2) issue said oscillator signal generated in said system in which said clock unit is resident as said local oscillator signal.

3. The redundant computer system of claim 2 which further includes, in each of said first and second computer systems, at least one memory unit, at least one system control unit and at least one input/output unit and in which said bus means further conveys said local clock and definer signals thereto.

4. The redundant computer system of claim 2 in which said first logic level is logic "1".

5. The redundant computer system of claim 4 which further includes, in each of said first and second computer systems, at least one memory unit, at least one system control unit and at least one input/output unit and in which said bus means further conveys said local clock and definer signals thereto.

6. The redundant computer system of claim 1 in which said first logic level is logic "1".

7. The redundant computer system of claim 6 which further includes, in each of said first and second computer systems, at least one memory unit, at least one system control unit and at least one input/output unit and in which said bus means further conveys said local clock and definer signals thereto.

8. The redundant computer system of claim 1 which further includes, in each of said first and second computer systems, at least one memory unit, at least one system control unit and at least one input/output unit and in which said bus means further conveys said local clock and definer signals thereto.

9. A redundant computer system comprising:

A) first and second computer systems, each said first and second computer system including:

1) at least one central processing unit, at least one memory unit, at least one system control unit and at least one input/output unit;

2) a clock unit including:

a) a clock generating and distribution unit including oscillator means for generating an oscillator signal at a predetermined frequency;

b) clock and definer signal generating means driven by a local oscillator signal selected from said oscillator signals generated in each of said clock generating and distribution units, said clock and definer signal generating means being adapted to generate a clock signal at said predetermined a predetermined frequency of said local oscillator signal and a definer signal having a frequency which is half said predetermined signal of said local oscillator signal, said clock generating and distribution unit further including time alignment means for delaying one of said clock and definer signals such that successive definer signal half cycles at logic "1" and logic "0" levels bracket said clock signal full cycles at a first logic level, selected from logic "1" and logic "0" levels, to temporally define successive clock pulses at said first logic level as first and second phases thereof, b) selection circuit means for selecting said local oscillator signal from only one of said first system and said second system for development of said clock and definer signals as local clock and definer signals; and c) clock bus means for conveying said local clock and definer signals to said central processor unit, said memory unit, said system control unit and said input/output unit to coordinate the data manipulation operations therein and therebetween;

B) a system bus coupling said central processor unit, said system control unit and said input/output unit together for information exchange therebetween;

C) means coupling said oscillator signals generated in each of said first and second computer systems to said selection circuit means in each of said first and second computer systems; and D) said selection circuit means in each said clock unit further including:
  1) clock mode selection means for selecting one of master and slave mode operation for the system in which said clock unit is resident;
  2) first hold means responsive to the selection of said slave mode of operation for invoking a first hold condition on said local oscillator signal at a first logic level when said local clock and definer signals are both at said first logic level;
  3) first sensing means for sensing when said definer signal in said system in which said clock unit is not resident is at said first logic level;
  4) first switchover means responsive to said first sensing means sensing that said definer signal in said system in which said clock unit is at said first logic level to:
    i) release said first hold invoked by said first hold means; and
    ii) issue said oscillator signal generated in said system in which said clock unit is not resident as said local oscillator signal;
  5) second hold means responsive to the selection of said master mode of operation for invoking a second hold on said local oscillator signal at a first logic level when said local clock and definer signals are both at said first logic level;
  6) second sensing means for sensing when, after said second hold condition has been invoked, said local clock and definer signals are both at said first logic level and said oscillator signal generated in the system in which said clock unit is resident switches to said first logic level; and
  7) second switchover means responsive to said second sensing means sensing that said local clock and definer signals and said oscillator signal generated in the system in which said clock unit is resident are all at said first logic level to:
    1) release said hold invoked by said second hold means; and
    2) issue said oscillator signal in said system in which said clock unit is resident as said local oscillator signal; and E) switch means for coupling said system bus of said first system and said system bus of said second system for information exchange therebetween when one of said clock units is operating in the slave mode.

* * * * *